(12) United States Patent
Mansell et al.

(10) Patent No.: US 9,158,574 B2
(45) Date of Patent: Oct. 13, 2015

(54) HANDLING INTERRUPTS IN DATA PROCESSING

(75) Inventors: David Hennah Mansell, Cambridge (GB); Timothy Holroyd Glauert, Cambridge (GB); Michael Robert Nonweiler, Cambridge (GB)

(73) Assignee: ARM Limited, Cambridge (GB)

( * ) Notice: Subject to any disclaimer, the term of this patent is extended or adjusted under 35 U.S.C. 154(b) by 893 days.

(21) Appl. No.: 13/299,403

(22) Filed: Nov. 18, 2011
(Under 37 CFR 1.47)

(65) Prior Publication Data

US 2013/0067133 A1   Mar. 14, 2013

Related U.S. Application Data

(63) Continuation-in-part of application No. 12/379,970, filed on Mar. 5, 2009, now Pat. No. 8,086,829, which is a continuation of application No. 10/713,456, filed on Nov. 17, 2003, now Pat. No. 7,539,853.

(30) Foreign Application Priority Data

Nov. 18, 2002 (GB) .................................. 0226874.6
Feb. 14, 2003 (GB) .................................. 0303447.7

(51) Int. Cl.
*G06F 9/48* (2006.01)
*G06F 11/36* (2006.01)

(52) U.S. Cl.
CPC ............ *G06F 9/4812* (2013.01); *G06F 9/4806* (2013.01); *G06F 11/3636* (2013.01); *G06F 11/3656* (2013.01); *G06F 11/3664* (2013.01)

(58) Field of Classification Search
CPC ............................. G06F 9/4806; G06F 9/4812
See application file for complete search history.

(56) References Cited

U.S. PATENT DOCUMENTS

| 3,418,638 A | 12/1968 | Tomasulo at al. |
| 5,274,826 A | 12/1993 | Kardach et al. |

(Continued)

FOREIGN PATENT DOCUMENTS

| EP | 0 153 764 | 9/1985 |
| JP | 4-332045 | 11/1992 |

(Continued)

OTHER PUBLICATIONS

Related U.S. Appl. No. 10/714,518, filed Nov. 17, 2003, Watt et al.

(Continued)

*Primary Examiner* — Benjamin P. Geib
(74) *Attorney, Agent, or Firm* — Nixon & Vanderhye P.C.

(57) ABSTRACT

A method and apparatus for processing data when an interrupt is received during processing of a function at a point during the processing at which a portion of the function has been processed then a control parameter is accessed. In response to a control parameter having a value indicting that the function has idempotence, processing of the function is stopped, and information on progress of the function is discarded such that following completion of the interrupt the portion of the function that has already been processed is processed again. In response to the control parameter having a value indicating that the function does not have idempotence, processing of the function is suspended without discarding information on progress of the function that has already been processed such that following completion of the interrupt the processing is resumed from a point that it reached when it was suspended.

29 Claims, 8 Drawing Sheets

(56) References Cited

U.S. PATENT DOCUMENTS 6,282,657 B1  8/2001   Kaplan et al.
6,976,158 B2  12/2005  Catherwood et al.
2002/0174342 A1  11/2002  Freeman et al.

FOREIGN PATENT DOCUMENTS

WO   WO 01/46800   6/2001
WO   WO 02/29555   4/2002

OTHER PUBLICATIONS

Related U.S. Appl. No. 10/714,563, filed Nov. 17, 2003, Watt et al.
Related U.S. Appl. No. 10/714,519, filed Nov. 17, 2003, Watt et al.
Related U.S. Appl. No. 10/714,565, filed Nov. 17, 2003, Watt et al.
Related U.S. Appl. No. 10/714,521, filed Nov. 17, 2003, Belnet et al.
Related U.S. Appl. No. 10/714,561, filed Nov. 17, 2003, Watt et al.
Related U.S. Appl. No. 10/714,520, filed Nov. 17, 2003, Belnet et al.
Related U.S. Appl. No. 10/714,483, filed Nov. 17, 2003, Watt et al.
Related U.S. Appl. No. 10/714,178, filed Nov. 17, 2003, Orion et al.
Related U.S. Appl. No. 10/714,484, filed Nov. 17, 2003, Watt et al.
Related U.S. Appl. No. 10/714,562, filed Nov. 17, 2003, Watt et al.
Related U.S. Appl. No. 10/714,560, filed Nov. 17, 2003, Watt et al.
Related U.S. Appl. No. 10/714,516, filed Nov. 17, 2003, Watt et al.
Related U.S. Appl. No. 10/714,482, filed Nov. 17, 2003, Watt et al.
Related U.S. Appl. No. 10/713,454, filed Nov. 17, 2003, Mansell et al.
Related U.S. Appl. No. 10/713,303, filed Nov. 17, 2003, Watt et al.
Related U.S. Appl. No. 10/714,480, filed Nov. 17, 2003, Watt et al.
Related U.S. Appl. No. 10/714,481, filed Nov. 17, 2003, Watt e.
Trusted Computing Group (TCG), Main Specification Version 1.1a, Sep. 1, 2001, pp. 1-x and 1-322.

HANDLING INTERRUPTS IN DATA PROCESSING

This application is a Continuation-in-Part of application Ser. No. 12/379,970 filed Mar. 5, 2009 now U.S. Pat. No. 8,086,829, which was a Continuation of application Ser. No. 10/713,456 filed Nov. 17, 2003 now U.S. Pat. No. 7,539,853 and which claims priority to GB Application No. 0226874.6 filed Nov. 18, 2002 and GB Application No. 0303447.7 filed Feb. 14, 2003. The entire contents of these applications are incorporated herein by reference.

FIELD OF THE INVENTION

The present invention relates to the field of data processing, and in particular, in certain preferred embodiments to the interrupting of data processing functions.

DESCRIPTION OF THE PRIOR ART

Data processors which are operable to perform a plurality of functions are known. Generally, data processors that can run multiple functions have the ability to interrupt a function that is being processed at a particular moment in order to be able to start processing a different function. This is done using interrupts and these are used if, for example, a function having a higher priority than the one being processed needs processing. Following processing of the function for which the interrupt was generated, the processor will generally resume processing of the interrupted function at the point at which it was interrupted. To enable the processor to be able to do this, the processor will store the context of the processor at the interrupt point, and will restore this stored context when the interrupt function has completed.

There are circumstances in which it is not advisable or desirable to resume an interrupted function and store the interrupted state, and in some cases doing so may cause problems with the processor. This may, for example, be due to the function that is being processed, or it may be due to the mode in which the processing of the function is occurring. In some circumstances processors may disable the interrupts during this portion of their processing. When the situation changes such that interrupts would be acceptable, the interrupts are enabled. At this point any pending interrupts are dealt with. A problem with this is that the interrupt latency is increased, and if the interrupt is a particularly urgent one then this can cause severe problems.

Other circumstances where it may be undesirable to interrupt a process and store context to memory is where the process is updating a lot of state so that the storage of this state or context to memory is both time consuming and power intensive. Graphics processing for example often involves the parallel processing of very many threads that may represent quite small tasks, such that interrupting them and storing the context to memory may not reduce the latency of the interrupt by very much, but will increase power consumption considerably.

An alternative way of dealing with interrupts in graphics is to use a soft stop mechanism, in which in response to receipt of an interrupt the current work group is completed and then the interrupt is taken. In the context of graphics processing a work group corresponds to the same function being performed on a large number of data items. Completing the work group before taking the interrupt avoids the need to store a lot of context to memory and provided that the work group is quick to complete may have acceptable latency. However, there will be some increase in latency and this can be significant in particular for work groups performing more complex functions or when the graphics processing units are performing general purpose processing where the tasks are often relatively long.

It would be desirable to be able to respond to interrupts without needing to store a large amount of data to memory or unduly increasing the latency of the interrupt.

SUMMARY OF THE INVENTION

A first aspect of the present invention provides, a method of processing data comprising: processing a function using a processor operable to perform a plurality of functions; receiving an interrupt during processing of said function at a point during said processing at which a portion of said function has been processed; accessing a control parameter, said control parameter indicating whether said function has idempotence or not; in response to said control parameter having a value indicating that said function has idempotence, stopping processing of said function without processing said function further, and discarding information on progress of said function such that following completion of said interrupt said portion of said function that has already been processed is processed again; and in response to said control parameter having a value indicating that said function does not have idempotence, suspending processing of said function without discarding information on progress of said function that has already been processed such that following completion of said interrupt said processing resumes from a point that it reached when it was suspended.

The provision of a control parameter which indicates whether a function is idempotent or not allows a processor to select one of two possible behaviours following an interrupt. An idempotent function is one that does not overwrite its inputs, such that if the function is stopped part way through and restarted the outcome will be the same as had it not been stopped. This means that in circumstances where saving the context of the function to memory may be undesirable, then if it is determined that the function is idempotent, an interrupt can be accepted and the function simply stopped immediately without the need to store the context to memory. The function can later be resumed from the beginning.

Where the function is not idempotent then no context is discarded and the processing resumes following the interrupt from the point at which it was suspended.

It should be noted that an interrupt is any signal that causes a function that it is currently being processed to be interrupted, that is stopped to allow another process to be performed. In this regard the interrupt may be a signal from a timer indicating it is time to perform a next task, or it may simply be an instruction to perform a next task that is of a higher priority than the task currently being executed. For example in a GPU/CPU system, the CPU will control the GPU and software running on the CPU may determine at some point that the GPU needs to perform a different task to the one it is currently performing and this constitutes an interrupt for the GPU.

In some embodiments where the function is not idempotent on receipt of the interrupt the function may be processed further prior to being suspended, and in some cases the function is finished before the interrupt is allowed to proceed.

In graphics processing for example, a function may involve the same, operation being performed in parallel on many different data items and thus, suspending a function and saving the context may involve saving a large amount of state. Furthermore, in some graphics processing individual functions often do not take long to perform and thus, it may be advantageous to simply let the function complete, whereupon the relevant data is updated, and only then accept the interrupt. Provided the function does not take long the increase in latency will be small and there will be no additional power requirements for saving the intermediate state to memory. It should be noted that although in pure graphics processing tasks are often short, if general purpose computing is being performed on a graphics processing unit (GPGPU), the tasks may be significantly longer such that waiting for the task to finish is not an acceptable option.

In other embodiments, however, it may be preferable when the function is not idempotent to save the context prior to suspending processing of the function so that it can be resumed at the point that it was interrupted. This allows the interrupt to be taken quickly and avoids the need to repeat the processing that has already occurred.

In some embodiments said function comprises at least one processing operation executed on a plurality of data items, said at least one processing operation being executed on said plurality of data items in parallel.

As noted previously this method is particularly effective where there are many threads operating in parallel, such that saving any intermediate state for these many threads may be onerous. The function may, for example, correspond to a work group in a graphics processing unit, which is the same operation being performed in parallel on many data items, for instance the pixels in a particular tile.

In some embodiments, said method is performed using a central processing unit and at least one graphics processing unit comprising said processor; wherein said graphics processing unit comprises a task manager for receiving at least one task to be performed from said central processing unit and dividing each of said at least one tasks into a plurality of said functions.

As noted previously, the embodiments of the present invention may be particularly advantageous in graphics processing, where a task is divided into a plurality of functions or work groups and each function is processed by a processor core. These functions are often quite short and are also often idempotent. In this regard it should be noted that some of the longer functions may also be idempotent, or where they are not it may be possible to amend them to make them idempotent. This means that providing an interrupt mechanism that is idempotent aware and allows a processor to be interrupted without saving the context can be advantageous. This is typically so in graphics where there may be a lot of context to save, where the functions are often quite short and thus, starting them from the beginning again does not have a large overhead in time and power and where many of the functions are idempotent and so advantage can be taken of this.

In some embodiments, said method is performed on a data processing apparatus comprising said central processing unit, said graphics processing unit and a memory, said memory comprising a function completed storage location for storing a value indicative of which of said plurality of functions have completed, said value being updated by said graphics processing unit.

Where the task is divided into functions that are each marked as idempotent or not and each interrupted individually, it may be advantageous if a value is stored in memory indicating which of the functions have completed and which have not. In this way, following resumption of the task after an interrupt the task does not need to be resumed at the beginning but can be resumed at the first incomplete function, even where the task was idempotent and no context was saved.

In some embodiments, said step of stopping processing of said function in response to said task having idempotence, further comprises updating said value in said memory indicating which of said plurality of functions has completed prior to processing said interrupt.

Where the function is idempotent and the processing of the function is simply stopped then prior to processing the interrupt the number of functions that have completed successfully should be stored to memory. Dividing a task into functions not only makes it efficient to process on the GPU processors but also means that if a task is interrupted it is in effect just a function that is interrupted; and provided that a value is stored indicating which functions have completed, on resumption of the task, the task can be resumed at the first non-completed function, and the whole task does not need to be repeated. In some embodiments, as each function is completed a value is updated in the GPU itself but not stored to memory. Thus, prior to processing the interrupt this value should be stored to memory so that on resumption of processing the task the number of functions that have completed can be known and they need not be repeated.

In some embodiments, said step of suspending processing of said function in response to said task not having idempotence, further comprises completing said function and updating said value in said memory indicating said function has completed prior to processing said interrupt.

Where the task is not idempotent and the function is completed prior to taking the interrupt then in this case too the value in the memory should be updated so that it is known which functions have completed.

In some embodiments, the method comprises a further step of processing said interrupt, reading said function completed value indicating which functions have completed and determining a next function from said task to be processed by said graphics processing unit.

When the interrupt has been processed then the interrupted incomplete task can be finished. Reading the value in memory indicating which functions have completed enables the task to be started again at a suitable point and avoids functions that have already been processed from being processed again.

In some embodiments, said method comprises said central processing unit receiving said interrupt and accessing said control parameter to determine whether said task currently being performed has idempotence; and in response to said task having idempotence said central processing unit issuing a hard stop signal to said graphics processing unit in response to which said graphics processing unit stops processing of said function without processing said function further, and discards information on progress of said function; and in response to said task not having idempotence said central processing unit issuing a soft stop signal to said graphics processing unit in response to which said graphics processing unit suspends processing of said function without discarding information on progress of said function; and said graphics unit issuing a signal to said central processing unit indicating that it is ready to receive further instructions.

The central processing unit may in some embodiments itself determine whether the function being processed by a GPU is idempotent or not and may process the interrupt to send a hard stop signal if it is idempotent or a soft stop if it is not. The GPU will respond to the hard stop by stopping processing immediately and will discard any context. In response to the soft stop the GPU will not discard context but may complete the function prior to signalling to the CPU that it is ready or the context may be saved to memory prior to signalling to the CPU that it is ready.

In other embodiments, said method comprises said central processing unit receiving said interrupt and transmitting a conditional stop to said graphics processing unit; said graphics processing unit determining from said control parameter whether said function currently being processed has idempotence or not and in response to said task having idempotence said graphics processing unit stopping processing of said function without processing said function further, and discarding information on progress of said function; and in response to said task not having idempotence said graphics processing unit suspending processing of said function without discarding information on progress of said function; and said graphics unit issuing a signal to said central processing unit indicating that it is ready to receive further instructions.

In some embodiments the CPU may send a conditional stop to the GPU which will itself identify whether the task it is currently processing is idempotent or not and act accordingly.

It should be noted that the control parameter may be stored within the graphics processing unit itself, within the CPU or within the memory.

Although the graphics processing unit may comprise a single processor in some embodiments it comprises a plurality of processors each configured to process said function. Where there are a plurality of processors in parallel then the GPU will divide the task into functions and each of the processors will process a function on a particular number of data items. If an image is being processed the data items will typically represent a tile within the image.

In some embodiments, said method comprises receiving said task to be performed at said graphics processing unit from said central processing unit; controlling each of said plurality of processors to perform one of said functions of said task; and in response to said functions being interrupted a predetermined number of times, on resuming said task following said predetermined number of interrupts, controlling a subset of said plurality of processors to perform said functions of said task.

Where there are more than one processor, each processor might be controlled to perform one of the functions of the task. This enables the task to be performed very quickly. However, if a function of the task is continually interrupted it may take a long time to complete or may never complete. Thus, in some embodiments on resuming the task following an interrupt having interrupted a function a predetermined number of times, a subset of the processors are controlled to perform the functions of the task and the other subset are left free. This means that the task proceeds more slowly but there are processors free such that if an interrupt occurs again the function does not need to be interrupted but can continue to be processed by the subset of processors while the other processors are used for the new task. This has a power advantage in that if the task is not interrupted the work it has already performed is not discarded and therefore does not need to be repeated.

In some embodiments, said method comprises a further initial step of analysing said function to determine if it is idempotent and setting said value of said control parameter.

The value of the control parameter may be set by an analysis of the code perhaps by a compiler. It may alternatively be set in response to a received instruction perhaps from a user. It may in some cases be advantageous for a user to be able to adjust the code so that it is idempotent and signal this to the GPU. In cases where a function has a lot of context and perhaps takes a long time to process then it is advantageous if it can be discarded rather than the context being saved to memory or the function being completed before the interrupt is processed. Thus, being able to make such a function idempotent and signal that this is the case can improve the efficiency of the GPU considerably.

A second aspect of the present invention provides a computer program product for storing a computer program which when executed on a data processor controls said data processor to perform the steps of the method according to a first aspect of the present invention.

A third aspect of the present invention provides an apparatus for processing data, said apparatus comprising: a processor for performing a plurality of functions; a control parameter storage element for storing a control parameter, a value of said control parameter indicating whether said function has idempotence or not; control circuitry for controlling said processor, said control circuitry being responsive to receipt of an interrupt while said processor is processing said function at a point at which a portion of said function has been processed to access said control parameter; and in response to said control parameter having a value indicating that said function has idempotence, to control said processor to stop processing of said function without processing said function further, and to discard information on progress of said function such that following completion of said interrupt said portion of said function that has already been processed is processed again; or in response to said control parameter having a value indicating that said function does not have idempotence, to control said processor to suspend processing of said function without discarding information on progress of said function that has already been processed such that following completion of said interrupt said processing resumes from a point that it reached when it was suspended.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
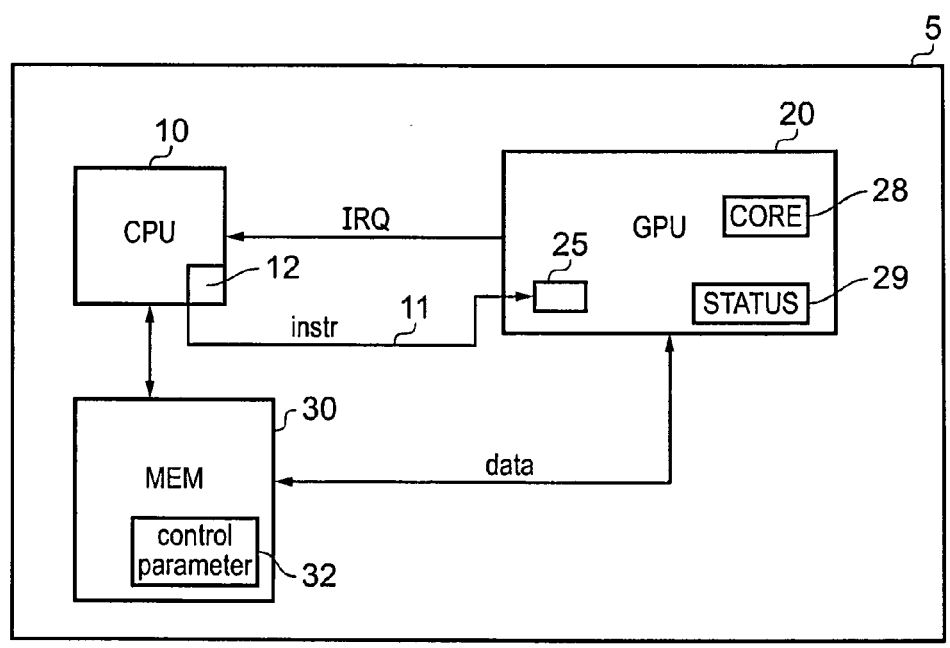
FIG. 1 shows a data processing apparatus according to an embodiment of the present invention.

FIG. 1 is a block diagram illustrating a data processing apparatus in accordance with an embodiment of the present invention. The data processing apparatus 5 has a central processing unit CPU 10 that communicates with the graphics processing unit GPU 20. There is also a memory 30 for storing data. The graphic processing unit 20 will perform graphics tasks processing data that is to be displayed as an image and may also perform general purpose computing tasks. It is designed to efficiently process multiple data items (for example pixels) in parallel on which a same operation is being performed. CPU 10 comprises control circuitry 12 that controls the GPU to perform these operations, for example by sending requests via peripheral bus 11.

Thus, the central processing unit will determine a task to be performed on the image and will store instructions for the task in the memory and will signal to the graphics processing unit to perform the task, this signalling may be done by updating a control register 25 within the GPU 20 by sending a request via peripheral bus 11. In response to this the GPU will access memory 30 and will retrieve the task. It will then split the task into different work groups or functions that it can process within its core 28. Each work group will relate to a particular area or tile on the image and will generally involve the same operation being performed on the pixels within the tile. When a work group is completed this will be indicated by updating a value within the status register 29 in the GPU. At a certain point the GPU may write this status value back to memory 30.

There is a control parameter 32 stored within memory 30 in this embodiment that is updated to store an indication of whether a task that is currently being performed by the GPU 20 is idempotent or not. This information is used to determine how the GPU should proceed when an interrupt is received.

Thus, CPU may receive an interrupt indicating that the GPU should perform some other task. This interrupt may be a timing signal indicating that it is time for the GPU to refresh the display screen or it may be an indication that the GPU should process a higher priority task.

In this embodiment the CPU will access control parameter 32 within memory 30 to determine if the task currently being executed by GPU 20 is idempotent or not. If it determines it is idempotent it will issue a hard stop instruction that it writes directly to a memory mapped register 25. In FIG. 1 a peripheral bus 11 can be used to update register 25 with the hard stop value. This indicates to the GPU 20 that the function that it is currently executing on core 28 should be stopped and any context or state relevant to the processing of that function can be discarded. The GPU 20 will therefore stop processing the function and it will write the value in status register 29 to memory 30 as this will provide an indication as to which functions or work groups within the task have been completed. It will then send an interrupt to CPU 10 indicating that it is ready to perform whatever task it was interrupted to perform and the CPU 10 will instruct the GPU 20 accordingly.

If the CPU 10 had determined from control parameter 32 that the task currently being performed by GPU 20 was not idempotent then it would update memory mapped register 25 with the soft stop value via peripheral bus 11. This would indicate to GPU 20 that it should finish processing the function that it is currently processing and only then should it issue an interrupt to CPU 10 indicating it is ready to perform the task it was interrupted to perform. In this regard, prior to transmitting the interrupt it will update the status register 29 and save the value to memory 30 indicating which functions it has completed.

When the GPU 20 has finished executing the task it was interrupted to perform then the CPU will instruct it to resume processing the task that was interrupted.

The GPU will then load the task from the memory into a control register and the status value into status register 29 and it will then proceed to process the next function within the task list that has not so far been processed. It will know which function this is from the value in the status register 29. Thus, had the task that had been interrupted been idempotent then the function that was being executed at the time of the interrupt would not have been completed and thus it is this task that is started again. If however the task had not been idempotent the function would have been completed and it is the next function that is processed. In the latter case one resumes further into the task but the delay for taking the interrupt would have been longer.

Figure 2:
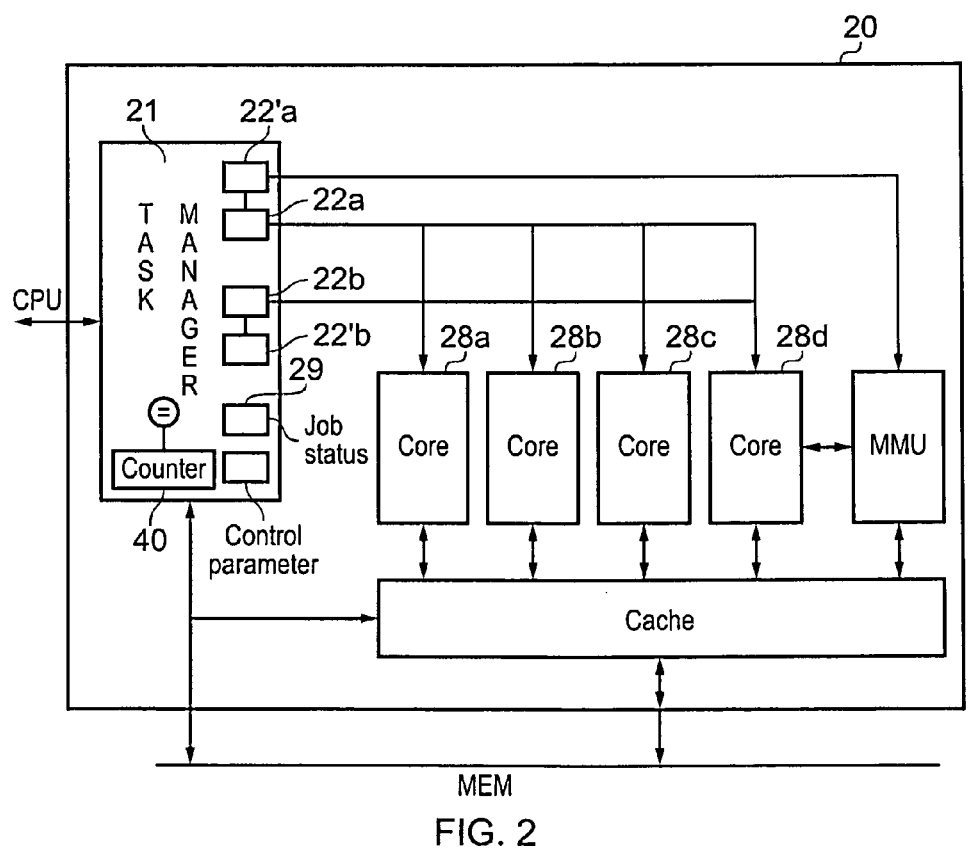
FIG. 2 shows a graphics processing unit according to an embodiment of the present invention.

FIG. 2 shows a GPU 20 of a further embodiment in more detail. In this embodiment GPU 20 has four processor cores 28a, 28b, 28c and 28d. It also has a task manager 21 that has a plurality of sets of control registers 22a and 22b and shadow control registers 22a' and 22b' that hold the control values for controlling the four cores. Each set of control registers includes an affinity mask register which indicates which of the four cores associated tasks can be run on. Thus, if a single task is being run by the GPU, one set of control registers say 22a is programmed with a mask value indicating that all cores can be used and a value indicative of the task. In this case the other set of control registers 22b and 22b' are not used. If two tasks are being run simultaneously, one set of control registers say 22a is programmed with a mask value identifying say two of the cores 28a, 28b and the tasks to be executed on these two cores, while the other set of control registers 22b is programmed with a mask value identifying the other two cores 28c, 28d and the other of the two tasks to be executed by these two cores.

The control registers and shadow control registers allow several lists of tasks to be processed in sequence. The control registers can be programmed with a whole list of tasks at once, the list of tasks being arranged as a linked list in memory, with the register identifying the current list and the shadow registers identify the next list to be processed.

In this embodiment there is also an MMU and a cache that allow the GPU to access data that is stored in the memory. There is also a job status register 29 within the task manager 21 that stores a value indicating how many functions have been completed and a register for storing two control parameters which indicate whether or not the current tasks being controlled by register 22a and 22b respectively are idempotent.

In this embodiment, the CPU on detecting an interrupt will simply update memory mapped register 25 with a conditional stop value via peripheral bus 11 and it is the GPU itself that determines whether the current task is idempotent or not and therefore how it should proceed. Thus, in response to the conditional stop value being written to the memory mapped register 25 the GPU will examine the control parameter and if it shows that the current task is idempotent it will stop processing the current task in each of the cores immediately and will write the value in job status register 29 back to the memory. It will then send an interrupt to the CPU indicating that it is ready to receive the next task.

If the control parameter indicates that the current task is not idempotent then the task manager will complete the processing of the current function in each of the cores, will update the status register 29 and write it to memory and will only then issue an interrupt to the CPU indicating that it is ready to receive the new task.

As noted above, in this embodiment, there are shadow registers for holding control values and this enables a list of tasks to be performed such that a next task is stored in the shadow register allowing a core to process a next task as soon as the previous one has completed. The GPU 20 will in any case send an IRQ to the CPU on completion of a task such that the shadow register can be updated with a new task.

The use of different control registers that can control different cores means that in some embodiments different tasks can be performed in parallel by different cores. This may be convenient where a task keeps being interrupted with the consequent power waste associated with repeatedly throwing work away, increased latency and potential risk of the task never completing. In such a case, when it is determined that a particular function in a task has been interrupted a certain number of times, then following the interrupt when the task is reloaded to be resumed it is reloaded into one of the control registers with a mask indicating that it should be processed by only a subset of the cores. The other cores will then be available to process other tasks. This will allow the frequently interrupted task to proceed to finish.

A disadvantage is that if no interrupt is received only a subset of the cores are being used. It is for this reason that this only occurs once a certain number of interrupts has been received. In order to determine how many interrupts are received a counter 40 is updated whenever an interrupt interrupts a particular function in a task. When this counter reaches a predetermined number, say 2, then on resuming the task only a subset of the cores are used and the other control register is left vacant to receive a new task. If the task completes without an interrupt occurring then the counter is cleared. It should be noted that in the above embodiment the number of interrupts that occur in a task is the factor that determines when a subset of the cores should be used, while in other embodiments it may be the number of interrupts that occur in a function that is counted and used to determine this.

Figure 3:
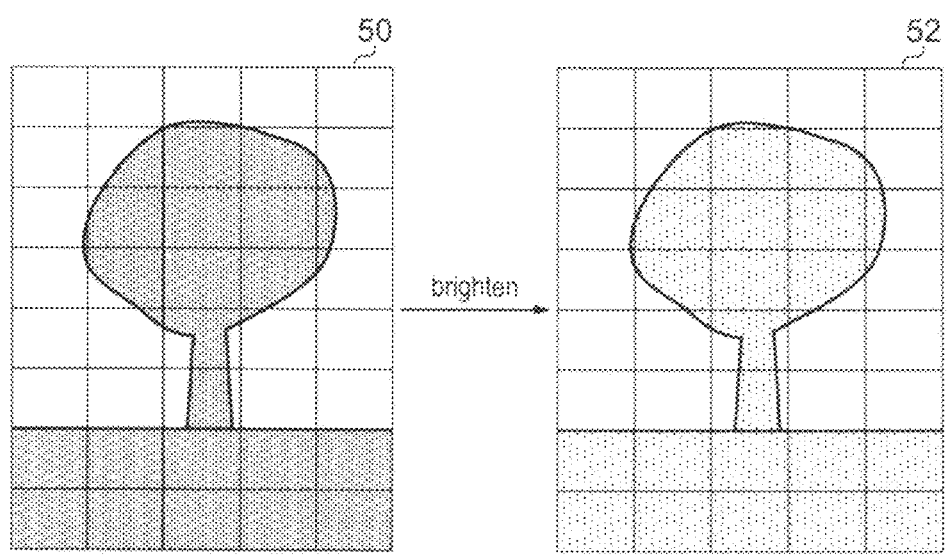
FIG. 3 schematically shows a graphics task being performed on an image.

FIG. 3 schematically shows an image 50 on which a task in this case "brighten" is performed to produce image 52. Image 50 is divided into tiles. The tiles are of a suitable size for the cores within the GPU 20 that is processing them. Thus, processing of the brighten function for each tile is performed as a work group within a core. In one example the core is able to process 256 operations in parallel and each tile has 256 pixels. Thus, each pixel can be brightened in parallel within a particular tile and when that work group or function has completed the status register in the GPU will be updated and the next function will be performed. In the case of there being four cores then four tiles will be processed in parallel and then the next four and so on.

Figure 4:
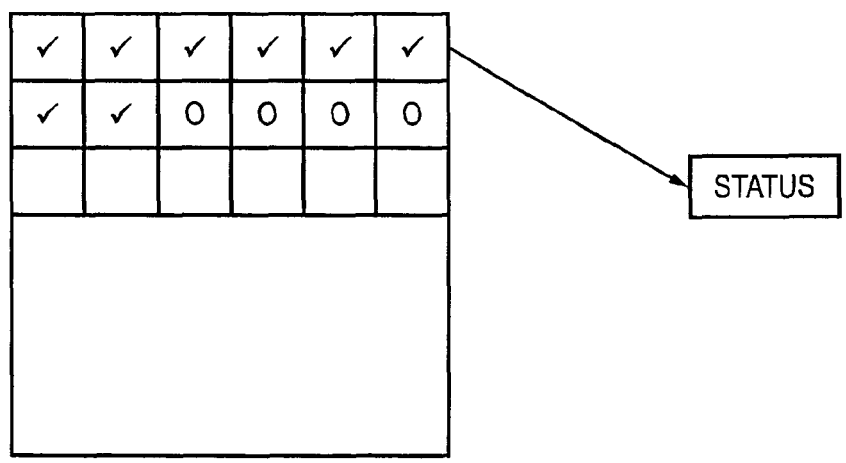
FIG. 4 schematically shows how an image is divided into tiles and work groups are performed on each tile.

FIG. 4 shows very schematically tiles that are currently being processed and those where the processing has completed. The completed processing is shown with a tick and the status register stores a value indicating how many tiles have completed. In this figure the tiles with a 0 in them are currently being processed. If an interrupt is received then if the function is idempotent processing on the tiles with a 0 in them is stopped and the value indicating that currently eight tiles have been completed is stored to memory. In the case that the function being processed is not idempotent then the tiles with the 0 in them complete their processing and the status register will be updated to 12 indicating that 12 tiles have been completed. Thus, once the interrupt has been processed and the task is resumed in the case that the task was idempotent the task will resume on tiles 9, 10, 11 and 12 whereas in the case that the task was not idempotent it will start on tiles 13, 14, 15 and 16.

Figure 5:
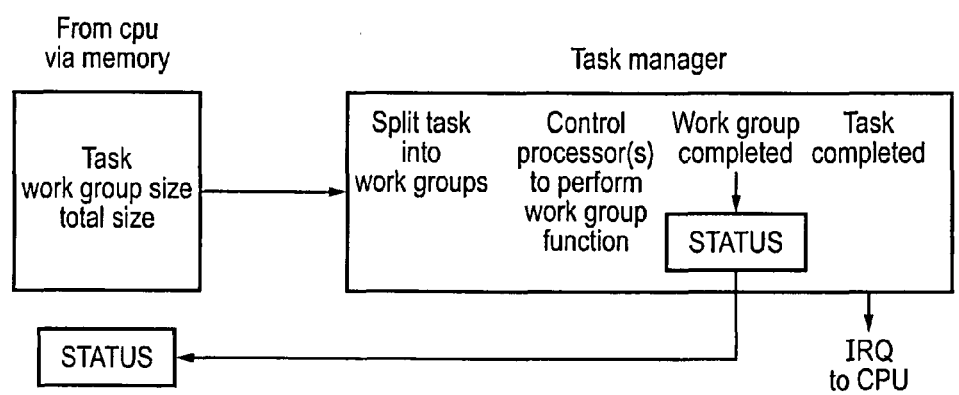
FIG. 5 schematically shows a job manager within a graphics processing unit and the tasks that it performs.

FIG. 5 shows schematically the functioning of the task manager of the GPU 20. A CPU indicates to the GPU that it should perform a task and the task manager will retrieve information regarding that task from the memory. The information will include the task that is to be performed and it will also include details of the work group size for that task and the total size. The task manager will then split the task into work groups which correspond to the tiles of FIGS. 3 and 4 and it will control the one or more processors within the GPU to perform a work group function. That is to perform the operations of the task on the pixels within a particular tile. When the work group has completed it will update a status register to indicate that that tile has been processed for that task. When the task is completed it may issue an interrupt to the CPU indicating that it has completed and the CPU should check the data that it has generated and perhaps give it a new task. In this regard, in some embodiments the GPU will process a list of tasks and thus, it is only when the list of tasks has completed that it will issue the interrupt.

Figure 6:
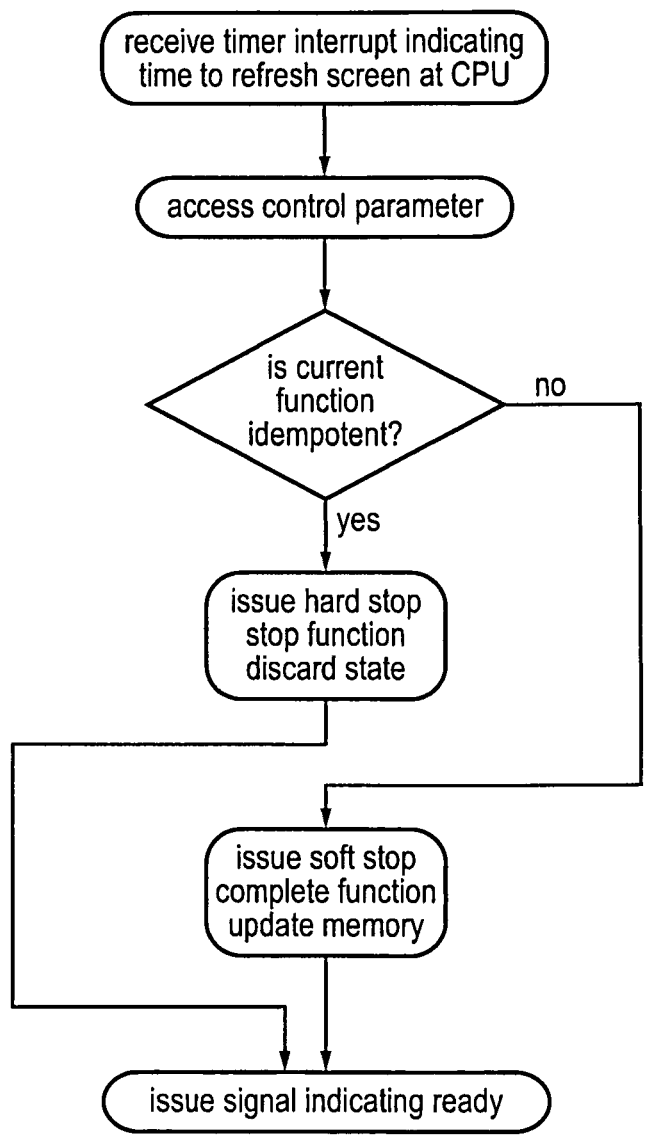
FIG. 6 schematically shows a flow diagram illustrating steps in a method for processing interrupts according to an embodiment of the present invention.

FIG. 6 schematically shows steps in a method according to an embodiment of the present invention. In this embodiment a timer interrupt is received by the CPU that indicates it is time to refresh the display screen. The CPU will then access the control parameter that may be stored on the CPU itself or in the memory and it will determine from this control parameter whether the task currently being performed by the GPU is idempotent or not. If it is idempotent then it will issue a hard stop command to the GPU and in response to this the GPU will stop processing the function it is currently processing and it will discard any state regarding the processing of that function.

If the current function is not idempotent then the CPU will issue a soft stop and the GPU will complete the function it is currently executing and it will update memory with a value indicating that it has completed that function. It should be noted that in the case of the function being idempotent if the GPU does not update the memory with the status after completing each function it will do so in response to an interrupt.

The GPU will then issue a signal indicating it is ready to perform the next task associated with the interrupt.

Figure 7:
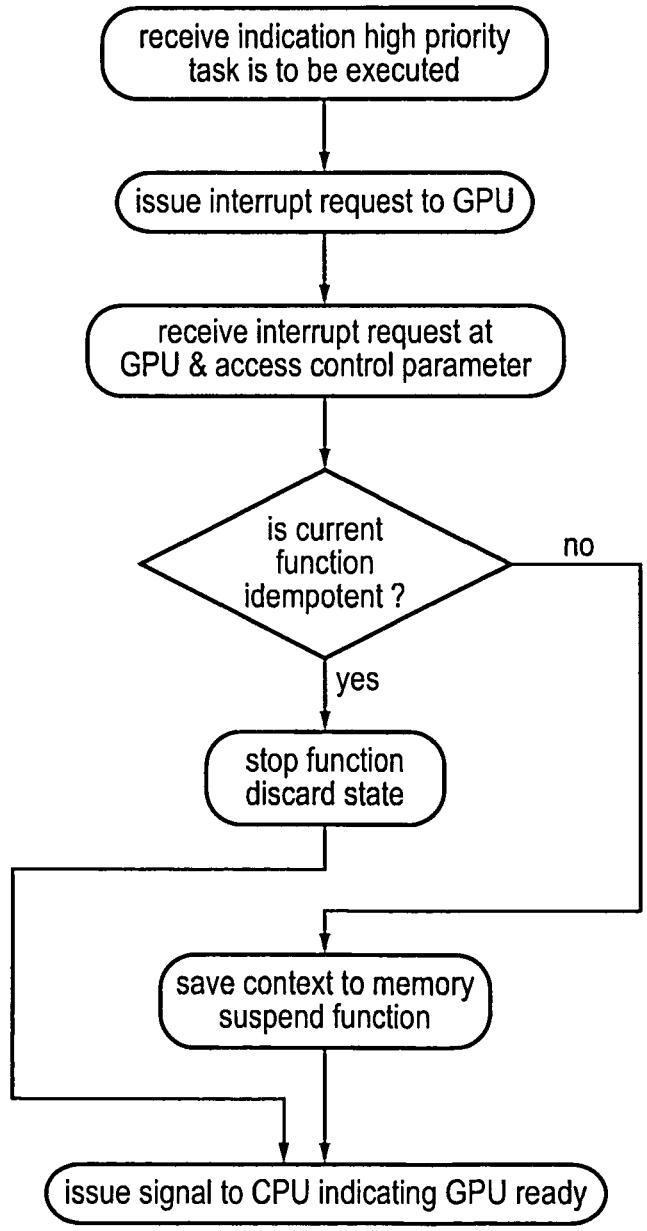
FIG. 7 schematically shows steps in a further method according to an embodiment of the present invention.

FIG. 7 shows a flow diagram illustrating an alternative method according to an embodiment of the present invention.

In this embodiment the CPU receives an indication that a high priority task should be executed by the GPU. It then issues a conditional stop request to the GPU indicating that it should stop doing what it is currently doing so that it can process this higher priority task. In response to receiving the conditional stop request the GPU will access the control parameter that in this embodiment is stored within the GPU itself to determine if the current task is idempotent or not. If it determines that it is idempotent then it will stop processing the function it is processing currently, it will discard the context, it will update the memory with the current status indicating how many functions have been completed and it will then issue a signal to the CPU that it is ready to receive the higher priority tasks.

If the current function is not idempotent then in this embodiment rather than completing the function it will save the context of the function to memory and it will suspend the function and then it will issue a signal to the CPU indicating the GPU is ready. In this case on resuming execution of the current task that was not idempotent the function will be restarted at the point that it was suspended by restoring the context from the memory. In the case that the function was idempotent it will restart at the beginning of the function.

It should be noted that saving context out to memory in this way can be costly in graphics processing as there can be a lot of context that needs to be saved for each of the different threads. However, in the case that the function being processed is one that requires a lot of time to complete then it may be worth while doing this.

In this regard, one should note that the control parameter indicating whether or not a function is idempotent can be set by an analysis of the task perhaps during compilation or it can be set by a user that is indicating that a task is idempotent and that this control parameter should therefore be set. In the latter case, providing this ability to set the idempotent flag also allows a user when writing the code to determine where it is undesirable that a function completes before taking an interrupt or saves its context to memory, and in such a case to ensure that the task is made to be idempotent and then to set the control parameter to indicate this, so that the function can be stopped and no context saved in response to an interrupt.

In the former case where the compiler sets the value of the parameter by an analysis of the code, this analysis may be very simple or it may be more complex. In code for example where all arguments to the function are marked as read-only or write-only then the compiler can quickly realise that the function must be idempotent and set the control parameter appropriately. Alternatively a deeper analysis may be required where the arguments are not marked as such, but analysis of the code shows that they are treated in this way even if some are marked as read/write.

Figure 8:
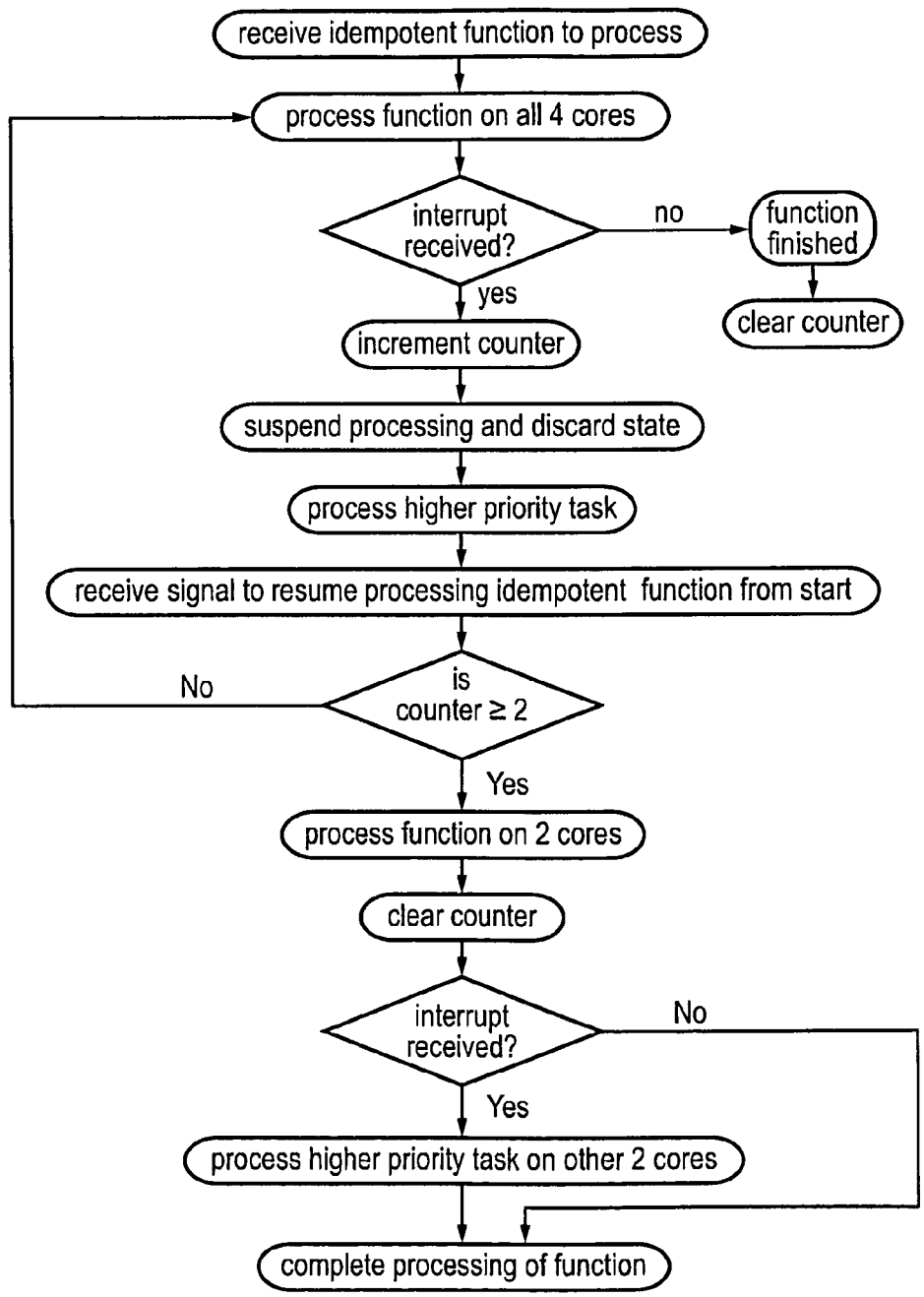
FIG. 8 schematically shows steps in a method for a multi core graphics processing unit according to an embodiment of the present invention.

FIG. 8 shows a method that can be performed by the GPU of FIG. 2 that has the plurality of processors and control registers.

In this method an idempotent function to be processed is received and it is processed on all four cores in parallel. It is then determined if an interrupt is received. If it isn't then the function is finished and a counter is cleared. If an interrupt is received then the counter is incremented such that a number of interrupts received during processing of this function is counted. The processing is then suspended and as the function is idempotent the state is discarded. The higher priority task is then processed and when this is completed a signal is received indicating that processing of the idempotent function that was interrupted should be resumed from the start of the function. At this point the value in the counter is read, and if in this embodiment it is greater than or equal to two then the function is processed on only two of the cores by setting the affinity mask in the control registers of the GPU of FIG. 2 to identify two of the cores for it to run on. If the counter is not greater than or equal to two then the function is processed by all four cores by setting the affinity mask to identify all four cores.

In the case that the function is to be processed in only two cores the counter is cleared. In this case if an interrupt is now received the higher priority task can be processed on the other two cores and the task currently being processed does not need to be interrupted and can be completed. In this way where a function is continually interrupted and does not look as though it will finish, its finish can be ensured by the use of these two control registers, one to control the interrupted task and the other to control the higher priority task. A disadvantage is that if the original function is not interrupted that it is processed on only two out of the four cores.

It should be noted that the control of the processor that is performed by control circuitry within the task manager can be hardware circuitry or it can be software run on a processor on the task manager. Similarly, the control of the signal to be sent to the GPU from the CPU indicating an interrupt, that is a hard stop or a soft stop can be performed on the CPU using control circuitry 12 in FIG. 1 or it can be controlled using software within the CPU.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:
1. A method of processing data comprising:
processing a function using a processor operable to perform a plurality of functions;
receiving an interrupt during processing of said function at a point during said processing at which a portion of said function has been processed;
accessing a control parameter, said control parameter indicating whether said function has idempotence or not;
in response to said control parameter having a value indicating that said function has idempotence, stopping processing of said function without processing said function further, and discarding information on progress of said function such that following completion of said interrupt said portion of said function that has already been processed is processed again; and
in response to said control parameter having a value indicating that said function does not have idempotence, suspending processing of said function without discarding information on progress of said function that has already been processed such that following completion of said interrupt said processing resumes from a point that it reached when it was suspended.

2. A method of processing data according to claim 1, wherein in response to said control parameter having a value indicating that said function does not have idempotence, processing said function further prior to suspending processing of said function.

3. A method of processing data according to claim 2, wherein said step of processing said function further prior to suspending processing of said function, comprises completing processing of said function.

4. A method of processing data according to claim 1, wherein in response to said control parameter having a value indicating that said function does not have idempotence performing a step of saving a context of said function that has been partially processed prior to suspending processing of said function.

5. A method of processing data according to claim 1, wherein said function comprises at least one processing operation executed on a plurality of data items, said at least one processing operation being executed on said plurality of data items in parallel.

6. A method of processing data according to claim 5, wherein said method is performed using a central processing unit and at least one graphics processing unit comprising said processor; wherein
said graphics processing unit comprises a task manager for receiving at least one task to be performed from said central processing unit and dividing each of said at least one tasks into a plurality of said functions.

7. A method of processing data according to claim 6, wherein said method is performed on a data processing apparatus comprising said central processing unit, said graphics processing unit and a memory, said memory comprising a function completed storage location for storing a value indicative of which of said plurality of functions have completed, said value being updated by said graphics processing unit.

8. A method of processing data according to claim 7, wherein said step of stopping processing of said function in response to said task having idempotence, further comprises updating said value in said memory indicating which of said plurality of functions has completed prior to processing said interrupt.

9. A method of processing data according to claim 7, wherein said step of suspending processing of said function without discarding information on progress of said function in response to said task not having idempotence, further comprising completing said function and updating said value in said memory indicating said function has completed prior to processing said interrupt.

10. A method of processing data according to claim 7, further comprising a step of following processing of said interrupt, reading said function completed value indicating which functions have completed and determining a next function from said task to be processed by said graphics processing unit.

11. A method according to claim 6, said method comprising:
said central processing unit receiving said interrupt and accessing said control parameter to determine whether said task currently being performed has idempotence; and
in response to said task having idempotence said central processing unit issuing a hard stop signal to said graphics processing unit in response to which said graphics processing unit stops processing of said function without processing said function further, and discards information on progress of said function
and in response to said task not having idempotence said central processing unit issuing a soft stop signal to said graphics processing unit in response to which said graphics processing unit suspends processing of said function without discarding information on progress of said function; and
said graphics unit issuing a signal to said central processing unit indicating that it is ready to receive further instructions.

12. A method according to claim 6, said method comprising:
said central processing unit receiving said interrupt and transmitting a conditional stop signal to said graphics processing unit;
said graphics processing unit determining from said control parameter whether said function currently being processed has idempotence or not and
in response to said task having idempotence said graphics processing unit stopping processing of said function without processing said function further, and discarding information on progress of said function
and in response to said task not having idempotence said graphics processing unit suspending processing of said function without discarding information on progress of said function; and
said graphics unit issuing a signal to said central processing unit indicating that it is ready to receive further instructions.

13. A method according to claim 6, wherein said graphics processing unit comprises a plurality of processors each configured to process said function.

14. A method of processing data according to claim 13, said method comprising:
receiving said task to be performed at said graphics processing unit from said central processing unit;
controlling each of said plurality of processors to perform one of said functions of said task; and
in response to said functions being interrupted a predetermined number of times, on resuming said task following said predetermined number of interrupts, controlling a subset of said plurality of processors to perform said functions of said task.

15. A method of processing data according to claim 1, comprising a further initial step of analysing said function to determine if it is idempotent and setting said value of said control parameter.

16. A method of processing data according to claim 1, comprising a further initial step of setting said value of said control parameter in response to a received instruction.

17. A computer program product for storing a computer program which when executed on a data processor controls said data processor to perform the steps of the method of claim 1.

18. An apparatus for processing data, said apparatus comprising:
a processor for performing a plurality of functions;
a control parameter storage element for storing a control parameter, a value of said control parameter indicating whether said function has idempotence or not;
control circuitry for controlling said processor, said control circuitry being responsive to receipt of an interrupt while said processor is processing said function at a point at which a portion of said function has been processed to access said control parameter; and
in response to said control parameter having a value indicating that said function has idempotence, to control said processor to stop processing of said function without processing said function further, and to discard information on progress of said function such that following completion of said interrupt said portion of said function that has already been processed is processed again; or
in response to said control parameter having a value indicating that said function does not have idempotence, to control said processor to suspend processing of said function without discarding information on progress of said function that has already been processed such that following completion of said interrupt said processing resumes from a point that it reached when it was suspended.

19. An apparatus according to claim 18, wherein said control circuitry is responsive to said control parameter having a value indicating that said function does not have idempotence to control said processor to complete processing of said function prior to suspending processing of said function.

20. An apparatus according to claim 18, wherein said control circuitry is responsive to said control parameter having a value indicating that said function does not have idempotence to control said processor to save a context of said function that has been partially processed prior to suspending processing of said function.

21. An apparatus according to claim 18, said apparatus comprising a central processing unit and at least one graphics processing unit comprising said processor; wherein
said graphics processing unit comprises a task manager for receiving at least one task to be performed from said central processing unit, said graphics processing unit being configured to perform said task by processing said function a plurality of times on said processor.

22. An apparatus according to claim 21, further comprising a memory said memory comprising a function completed storage location for storing a value indicative of which of said plurality of functions have completed, said graphics processing unit being configured to update said value.

23. An apparatus according to claim 22, wherein in response to said function not having idempotence said control circuitry is configured to complete said function and update said value in said memory indicating said function has completed prior to processing said interrupt.

24. An apparatus according to claim 22, wherein in response to said function having idempotence said control circuitry is configured to update said value in said memory indicating which of said plurality of functions have completed prior to processing said interrupt.

25. An apparatus according to claim 22, said control circuitry being configured following processing of said interrupt to read said function completed value indicating which functions have completed and to determine a next function from said task to be processed by said processor.

26. An apparatus according to claim 21, wherein:

said central processing unit comprises said control circuitry, said control circuitry being configured in response to said task having idempotence to issue a hard stop signal to said graphics processing unit, said graphics processing unit being configured to respond to said hard stop signal by stopping processing of said function without processing said function further, and discarding information on progress of said function;

and said control circuitry being configured in response to said task not having idempotence to issue a soft stop signal to said graphics processing unit, said graphics processing unit being configured to respond to said soft stop signal by suspending processing of said function without discarding information on progress of said function; and having stopped said processing, said graphics unit is configured to issue a signal to said central processing unit indicating that it is ready to receive further instructions.

27. An apparatus according to claim 21, wherein:

said graphics processing unit comprises said control circuitry; said central processing unit being configured to receive an interrupt signal and transmit a conditional stop signal to said graphics processing unit.

28. An apparatus according to claim 21, wherein said graphics processing unit comprises a plurality of processors each configured to process said function.

29. An apparatus according to claim 28, wherein:

said task manager comprises at least two control registers each for storing a control value for controlling at least one of said plurality of cores to perform a particular function;

said task manager being configured to respond to receipt of a task to be performed from said central processing unit;

to store a control value for said task in at least one of said at least two control registers to control all of said plurality of cores to perform said task; and in response to said task being interrupted a predetermined number of times, on resuming said task following said predetermined number of interrupts, to store a control value for said task in at least one of said at least two control registers to control a subset of said plurality of cores to perform said task.

* * * * *